(12) United States Patent
Douglas

(10) Patent No.: US 12,137,678 B2
(45) Date of Patent: Nov. 12, 2024

(54) INDICATOR WITH INTERNAL ATTACHMENT MECHANISM

(71) Applicant: Patrick Douglas, Golden Valley, MN (US)

(72) Inventor: Patrick Douglas, Golden Valley, MN (US)

(73) Assignee: Patrick Douglas, Golden Valley, MN (US)

( * ) Notice: Subject to any disclaimer, the term of this patent is extended or adjusted under 35 U.S.C. 154(b) by 0 days.

(21) Appl. No.: 17/653,823

(22) Filed: Mar. 7, 2022

(65) Prior Publication Data

US 2022/0279769 A1    Sep. 8, 2022

Related U.S. Application Data

(60) Provisional application No. 63/207,558, filed on Mar. 5, 2021.

(51) Int. Cl.
*A01K 93/00* (2006.01)
*A01K 91/03* (2006.01)

(52) U.S. Cl.
CPC .............. *A01K 93/00* (2013.01); *A01K 91/03* (2013.01)

(58) Field of Classification Search
CPC ................................ A01K 93/00; A01K 91/03
USPC ........... 43/44.93, 44.92, 44.95, 44.87, 43, 1, 43/43.1, 44.9, 44.91, 14; 24/135 R, 24/135 A, 135 N
See application file for complete search history.

(56) References Cited

U.S. PATENT DOCUMENTS

| | | | | | |
|---|---|---|---|---|---|
| 418,995 | A | * | 1/1890 | Tufts | A01K 95/00 24/114.5 |
| 1,259,597 | A | * | 3/1918 | Breen | F16G 11/00 24/135 R |
| 1,259,664 | A | * | 3/1918 | Peters | A01K 95/00 24/135 R |
| 1,321,660 | A | * | 11/1919 | Moriarty | F16G 11/06 24/135 R |

(Continued)

FOREIGN PATENT DOCUMENTS

FR    1314429 A  *  1/1963
JP    05-115232 A     5/1993

(Continued)

OTHER PUBLICATIONS

International Search Report and Written Opinion issued in related International Patent Application No. PCT/US2022/071000, dated Jul. 19, 2022.

(Continued)

*Primary Examiner* — Darren W Ark

(74) *Attorney, Agent, or Firm* — Merchant & Gould, P.C.

(57) ABSTRACT

A strike indicator and strike indicator tooling assembly for use in fishing. The strike indicator comprises two hemispheres that may form a substantially spherical outer dimension around fishing line. The two hemispheres may fit frictionally together to prevent movement or slipping of the fishing line between the two hemispheres once assembled. The hemispheres may be disassembled to replace the fishing line, and reuse the strike indicator. The tooling assembly comprises a top insert, and a bottom insert. The top insert and bottom insert compress around a foam sheet to form the spherical outer form figures of the two hemispheres.

12 Claims, 16 Drawing Sheets

(56) References Cited

U.S. PATENT DOCUMENTS

| | | | | |
|---|---|---|---|---|
| 2,241,851 A | | 5/1941 | Gilstrap | |
| 2,255,793 A | * | 9/1941 | Kridler | A01K 83/00 43/44.92 |
| 2,351,558 A | * | 6/1944 | Sykora | A01K 93/00 43/44.87 |
| 2,397,030 A | * | 3/1946 | Mercier | A01K 91/04 43/43.1 |
| 2,406,252 A | * | 8/1946 | Potter | A01K 93/00 43/44.9 |
| 2,729,014 A | * | 1/1956 | Johnson | A01K 95/00 43/42.49 |
| 2,754,616 A | * | 7/1956 | Law | A01K 93/00 43/44.91 |
| 2,764,838 A | * | 10/1956 | Singer | A01K 93/00 43/44.91 |
| 2,881,552 A | * | 4/1959 | Miller | A01K 93/00 24/115 R |
| 3,067,538 A | * | 12/1962 | Hines | A01K 95/00 43/43.1 |
| 3,107,451 A | * | 10/1963 | Sitzler | A01K 93/00 43/44.87 |
| 3,241,262 A | * | 3/1966 | Beverly | A01K 93/00 D22/146 |
| 3,827,175 A | * | 8/1974 | Howard | A01K 93/00 43/44.95 |
| 4,194,936 A | * | 3/1980 | Martuch | A01K 93/00 156/267 |
| 4,426,804 A | * | 1/1984 | Hutson | A01K 93/00 43/44.91 |
| 4,563,831 A | * | 1/1986 | Gibney | A01K 93/00 43/44.87 |
| 4,616,441 A | * | 10/1986 | Dmytriw | A01K 93/00 43/44.91 |
| 4,644,681 A | * | 2/1987 | Hutson | A01K 93/00 43/44.93 |
| 4,780,981 A | * | 11/1988 | Hayward | C22C 1/045 43/44.9 |
| 4,845,877 A | * | 7/1989 | Koetje | A01K 5/04 43/14 |
| 4,873,784 A | * | 10/1989 | Petron | A01K 93/00 43/44.95 |
| 4,893,433 A | * | 1/1990 | Scheffler | A01K 93/00 43/44.9 |
| 4,949,645 A | * | 8/1990 | Hayward | F42B 7/046 43/44.87 |
| 5,197,912 A | * | 3/1993 | Lengefeld | A01K 5/04 441/136 |
| 5,459,959 A | * | 10/1995 | Paradis | A01K 97/12 43/44.89 |
| 5,575,104 A | * | 11/1996 | Wilding | A01K 91/06 43/42.31 |
| 6,125,574 A | * | 10/2000 | Ganaja | A01K 91/03 24/136 L |
| 6,931,786 B1 | * | 8/2005 | Bennett | A01K 93/00 43/44.89 |
| 7,481,020 B1 | * | 1/2009 | Ruzicka | A01K 93/00 43/44.87 |
| 8,950,107 B1 | * | 2/2015 | Rosenbloom | A01K 95/02 43/44.87 |
| 9,301,514 B2 | * | 4/2016 | Pearcy | A01K 91/03 |
| 9,867,365 B1 | * | 1/2018 | Rosenbloom | A01K 95/02 |
| 2010/0037507 A1 | | 2/2010 | Cowin | |
| 2012/0060404 A1 | * | 3/2012 | Baron | A01K 93/02 43/44.87 |
| 2013/0239455 A1 | * | 9/2013 | Craig | A01K 5/04 43/14 |
| 2014/0150327 A1 | * | 6/2014 | Craig | A01K 5/04 43/14 |
| 2014/0250765 A1 | * | 9/2014 | Berchin-Miller | A01K 93/00 43/44.87 |
| 2015/0013211 A1 | * | 1/2015 | Schoenike | A01K 91/03 43/44.91 |
| 2020/0068863 A1 | * | 3/2020 | Cunic | A01K 93/00 |
| 2020/0068864 A1 | * | 3/2020 | Cunic | A01K 97/12 |

FOREIGN PATENT DOCUMENTS

| | | | | |
|---|---|---|---|---|
| JP | H0645448 U | * | 6/1994 | |
| JP | 2019195313 A | * | 11/2019 | |
| KR | 20080015903 A | * | 2/2008 | |
| KR | 10-1904910 B1 | | 11/2018 | |
| WO | WO-2011160089 A1 | * | 12/2011 | A01K 91/20 |

OTHER PUBLICATIONS

Letter to Daniel Bruzzone dated Jun. 13, 2024.

* cited by examiner

102A

102B

INDICATOR WITH INTERNAL ATTACHMENT MECHANISM

CROSS-REFERENCE TO RELATED APPLICATION

This application claims priority to U.S. Provisional Patent Application No. 63/207,558 filed Mar. 5, 2021, the disclosure of which is incorporated herein by reference in its entirety.

TECHNICAL FIELD

The present application is related to tools, equipment and methods for fishing. More specifically, the present application is directed to strike indicators or bobbers with substantially spherical outer form factors.

BACKGROUND

The sport of fishing uses several accessories to enable a fisherman's success. These accessories may include: bobbers, strike indicators, weights, or floats. While simple fishing mechanisms include a pole, fishing line, and a hook, the named accessories specifically add to the overall success in catching a fish. Bobbers are the traditional fishing equivalent to the strike indicators used by fly-fishers. Strike indicators are used to alert a fisherman when a fish has taken the fly or bait. Strike indicators also act as a bobber in that they float on the surface prior to a fish strike, and can prevent the fly, tippet, or leader from sinking.

Strike indicators ordinarily should be very light, buoyant, and easy to reuse. Further, ease of casting, sensitivity to strikes, and reducing drag across the water are also important. If a strike indicator is too heavy or disruptive, it can stir the water and scare away any fish. Fishing for many species of fish requires a stealth approach, in order to keep the fish in the area when casting. However, current strike indicators miss the mark on at least one of the above-mentioned characteristics.

One of the most widely-used types of bobbers found on the market today is described in U.S. Pat. No. 8,950,107 to Rosenbloom. The Rosenbloom patent describes a floating, spherical portion, and a protrusion extending therefrom that can be coupled to a line with a split screw and a nut. The line passes through the split screw and the nut is tightened to fasten it to the bobber. This design suffers from a significant defect, in that it is asymmetrical and non-cylindrical so that it will create less even flow in the water surrounding it when cast.

Furthermore, the split screw and nut described therein create a hassle for anglers. A market exists for spare locking nuts that can be used to replace the plastic parts that are easily lost, resulting in an unusable bobber and accumulation of plastic waste in streams. User comments and reviews for the products complain about using such designs in cold weather, wind, or just routine use. Others complain of lines getting snagged or caught in the screw base of the indicator during roll casts. Still others complain that the small screws are hard to use with gloves or big fingers.

Some other examples of similar structures include those shown in U.S. Pat. No. 418,995 (a hollow, metal sinker), U.S. Pat. No. 6,125,574 (a fastener with a tapered, mechanical-fit mating structure between halves), and U.S. Pat. No. 4,893,433 (a spherical slip bobber). None of these, however, provides a substantially spherical bobber that engages the line and avoids loose parts that can be lost.

Some strike indicators may require being tied to the leader, while others come with fastening systems, or even directly "stick" to the leader through adhesion or mechanical interference. The ease in attachment is crucial to overall satisfaction, and tedious attachment mechanisms, or situations where the threaded portion is wider than the receiving portion, can cause pain to the fingers and thumb caused by the hardware required for attachment. Stick-on indicators may fall off more easily on windy days, or glue themselves to the leader on hot days.

Strike indicators may even require tools or added items to attach the indicator to the leader, thus creating a problem if parts or pieces go missing or are lost, as they can easily fall to the ground or in the stream around the angler. Further, if the kit or tool does not include additional replacement parts, a fisherman may be out of luck when they realize the part is missing. Windy situations can also impact the effectiveness of a strike indicator. The strike indicator must therefore be equally light, buoyant, and securely attached to the leader to prevent tangling or moving.

Attaching the indicator to the line or leader may require an external protrusion from the indicator itself, to thread the line or leader through. The shape of the indicator itself may be round, spherical, cylindrical, disk-like, or oblong. The general shape of the strike indicator can also contribute to the overall effectiveness, buoyancy, and its ability to be casted efficiently. Several materials have been used for strike indicators, including foam, rubber, cork, yarn, or other materials that are known to be buoyant. Generally, strike indicators are either too heavy, too prone to kinking, knotting, or tangling the leader, or have additional appendages that create extra drag across the water.

Therefore, there exists a need for a strike indicator that is buoyant, lightweight, and does not have external protrusions or appendages.

SUMMARY

The present disclosure is directed to a strike indicator that may include two hemispheres having a substantially spherical outer dimension, with coupling components to facilitate a locking mechanism. The hemispheres may be composed of foam that is substantially compressible. The compressibility of the foam aids in the capture of the fishing line between the two spherical hemispheres. The rigid hardware within each hemisphere coming together prevents slip and holds the line in place. The foam may eliminate gaps between the top hemisphere and the bottom hemisphere when closed and a variety of line diameters. The foam may also create friction between the top hemisphere and the bottom hemisphere to keep the parts from coming unscrewed while in use. If a gap is present, it can catch and tangle fishing line during casting, but also prevents the need for different strike indicators based on the diameter of the fishing line. A screw and nut within each respective hemisphere captures the line to form a friction fit and prevent line movement relative to the strike indicator.

In one aspect, the smooth round surface of the two hemispheres prevents drag on the water, because there are no significant external protrusions or hardware to tangle line. Each coupling component may be internally located within the two hemispheres once assembled, so parts are not easily lost. Further, because the fishing line is passing between the two hemispheres that combine to define a substantially spherical outer form factor without discontinuities or protrusions, it is less likely that the line will become caught or snagged in the screw coupling component.

The coupling components used to facilitate the friction fit locking mechanism, include a female nut coupling component and a male screw coupling component. In one embodiment, the male screw component has a threaded portion, a head, and a notched portion. The notched portion engaging the gap of the bottom hemisphere and the screw coupling component rotationally fitting into the nut coupling component.

In another aspect, combining the coupling components with the foam of the two hemispheres creates a locking effect when the screw engages with the foam below the nut and on the surface of the two mating parts. This eliminates need for an additional washer part, or any other replacement parts because each aspect is stored within the two hemispheres. Further, the threaded portion of the screw requires significantly less pressure to apply and remove than screws with oversized threaded portions, enabling the use of less grip strength by increasing leverage on the screw and nut via the foam.

In yet another aspect, having two separate hemispheres allows the user to mix and match bottom hemisphere and top hemisphere colors to create the combination best suited for fishing conditions or to improve visibility for fishermen with color vision deficiency. Rather than a hinge or more permanent connection mechanism, the two hemispheres may use a friction fit locking mechanism to be easily separated by the user. The friction fit of the compressible foam prevents pain or discomfort when a user removes the two hemispheres of the strike indicator from the fishing line or leader.

In one embodiment, the tooling for the strike indicator may include a pair of aluminum or steel inserts. The aluminum inserts may have a top insert, and a bottom insert to form both hemispheres of the spherical outer form factor. Either of the top or bottom inserts, or both, may have air vents to increase ventilation during the compression process. During the manufacturing process, the top insert and bottom insert may compress around a sheet of foam to form the spherical outer form factor of the top and bottom hemisphere of the strike indicator. The compressibility of the foam may help facilitate a closer friction-fit of the top and bottom hemisphere, which may ensure that the strike indicator stays together. The close friction-fit and compressibility of the foam may also add to the performance of the strike indicator, because it may add grip on the line, while the rigid internal components of the two hemispheres may lock the line in place. Further, the compressed foam may be a very light material and increase overall castability.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1A:
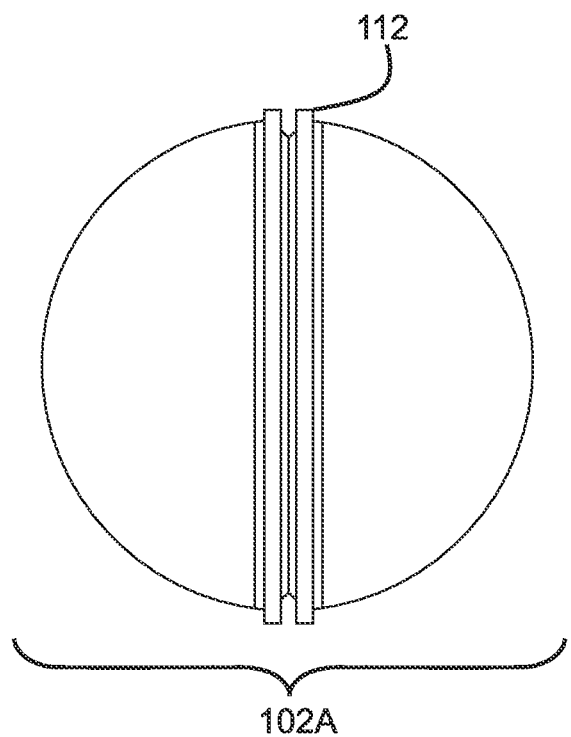
FIGS. 1A and 1B are side views of an assembled strike indicator, according to two embodiments.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure relates to a strike indicator assembly comprising two substantially spherical hemispheres with coupling components. The assembly comprises a top hemisphere and a bottom hemisphere. Either of both of the bottom hemisphere or the top hemisphere may have an internal gap to facilitate the engagement of a screw assembly to connect the top hemisphere to the bottom hemisphere. In other embodiments, the internal gap can be partially in the top hemisphere and partially in the bottom hemisphere. The screw assembly may comprise a female nut coupling component that may be reversibly engaged with the male screw coupling component. In embodiments, nothing (aside from a captured fishing line) extends beyond a substantially cylindrical outer form factor that would cause the indicator to be imbalanced or cumbersome.

Throughout this disclosure, the term "substantially" is used to make clear that the hemispherical or spherical form factor of the devices described herein need not be exact. As described in more detail below, in one embodiment these devices can be formed by compressing polymer foam, or in another by cutting cork to shape. Each of these processes has a tolerance and expected deviation. As shown in some of the drawings, in the polymer compression embodiment there may be slight lips at the base of the hemispherical portion, however it should be understood that this does not detract from the overall, substantially hemispherical nature of those components. Likewise, a slight misalignment between male and female portions of the nut and screw that holds these hemispheres is to be expected, and normal machining tolerances after quality control would not result in a device that is understood to have anything but a substantially spherical form factor. Depending on the processes and materials used, these tolerances can vary from device to device, and "substantially" is used as a stand-in to acknowledge the variability of these physical processes and materials. As a general matter, as described above, devices should be understood to be substantially spherical if they create negligible non-uniform drag that would be undesirable to a fly-fisher, such as those caused by conventional devices that include asymmetric or protruding features.

Figure 1B:
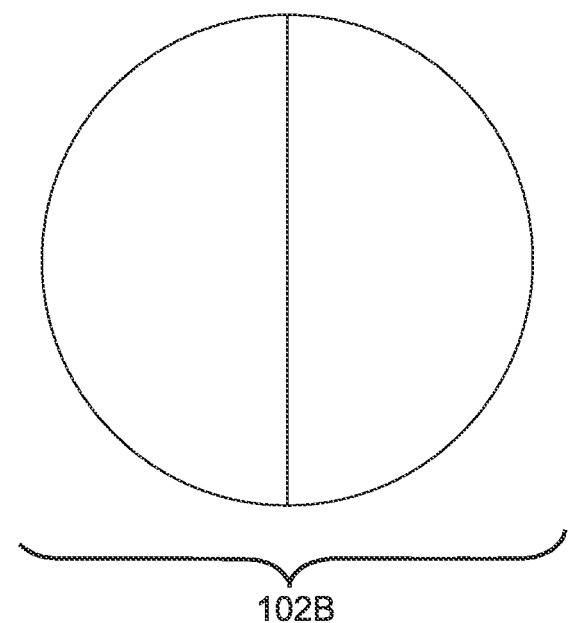

Referring now to FIGS. 1A and 1B, a representative embodiment of an assembled strike indicator (102A and 102B, respectively). FIGS. 1A and 1B illustrate example embodiments of a side view of the assembled strike indicator. These two drawings show two similar embodiments; the version in FIG. 1A includes a small flange 112 (see FIG. 2A) formed during a manufacturing process, while FIG. 1B has a substantially spherical form factor that that eliminates this flange structure. Despite this minor structural difference, each of these overcomes the deficiencies of conventional devices described above.

Figure 2A:
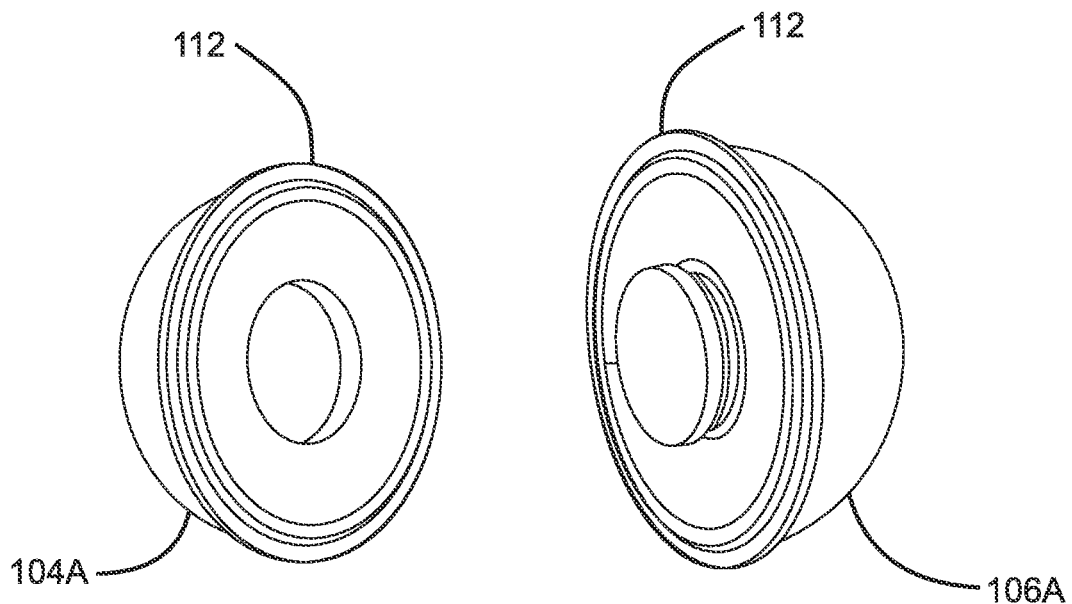
FIGS. 2A and 2B are exploded views of a top hemisphere of a strike indicator, and a bottom hemisphere of a strike indicator, in an open or non-threaded arrangement, according to the embodiments shown in FIGS. 1A and 1B.
Figure 2B:
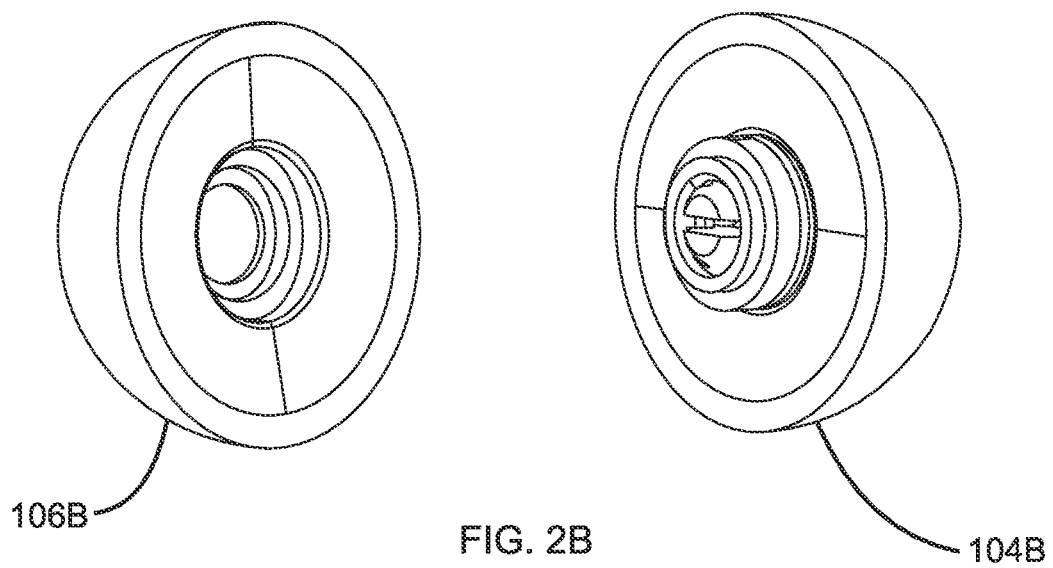
Figure 7:
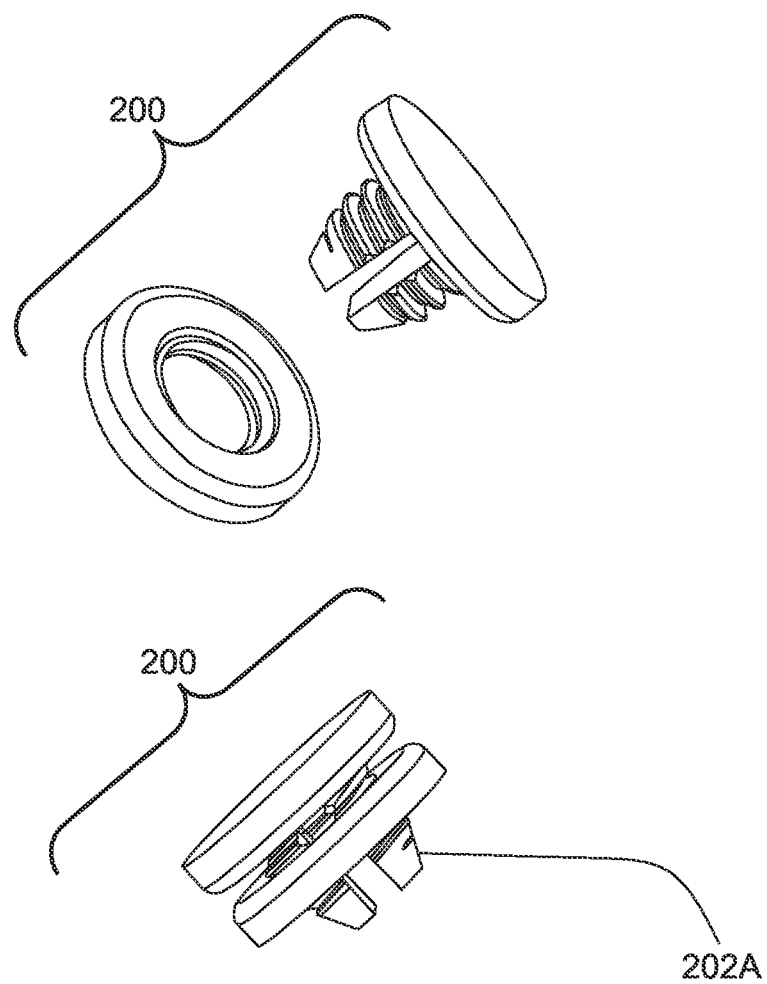
FIG. 7 is a perspective view of a screw assembly, with a female nut coupling component and a male screw coupling component.

The top and bottom hemispheres (104A/104B and 106A/106B, respectively, as shown in FIGS. 2A and 2B) are interlocked using the screw assembly 200 (see FIG. 7). According to the side view in FIGS. 1A and 1B, fishing line 114 (see FIG. 8) of any diameter may run vertically, passing through where the two hemispheres abut one another. The fishing line 114 diameter may fall within the range of 0.10-0.60 mm, in embodiments. The top and bottom hemispheres (104A/104B and 106A/106B) may be held together using the screw assembly 200. The top and bottom hemispheres (104A/104B and 106A/106B, respectively) abut one another to form the spherical outer dimension of the assembled strike indicator 102A/102B, when the flat portions of the hemispheres abut one another.

Different embodiments within the scope of the invention can have different sizes. For example a "small sized" embodiment can be configured for use with line sizes of 0.10 to 0.60 mm, and the device itself when assembled as a diameter of 0.65 inches (16.5 mm). A medium-sized device can be used with larger lines, such as from about 0.21 mm to about 0.60 mm, and the device has an assembled diameter of 0.85 inches (21.6 mm). A large-sized device can be suitable for lines having a diameter of 0.40 mm to about 0.60 mm, and have an assembled diameter of 1.05 inches (26.7 mm). Larger devices may be more suitable for larger line sizes, to correspond to expected fishing conditions and avoid snapping thin lines in extreme scenarios.

In addition to the advantages described above, devices described herein can have interchangeable top and bottom hemispheres. For a variety of reasons both practical and aesthetic, an angler may wish to have two differently colored halves to the device, for example. By mixing and matching these colors or patterns, specific combinations can be formed based on angler preference, or in tournaments to indicate a sponsor or team. It is therefore contemplated that kits including one or more hemispheres (whether only top hemispheres, only bottom hemispheres, or a combination of top and bottom hemispheres) could be provided that would facilitate this type of mixing and matching. These kits could be all of one type (bottom or top hemispheres) or they could be an assortment. Likewise, the kits could include different styles or colors from one another, or they could all be the same type.

Figure 9:
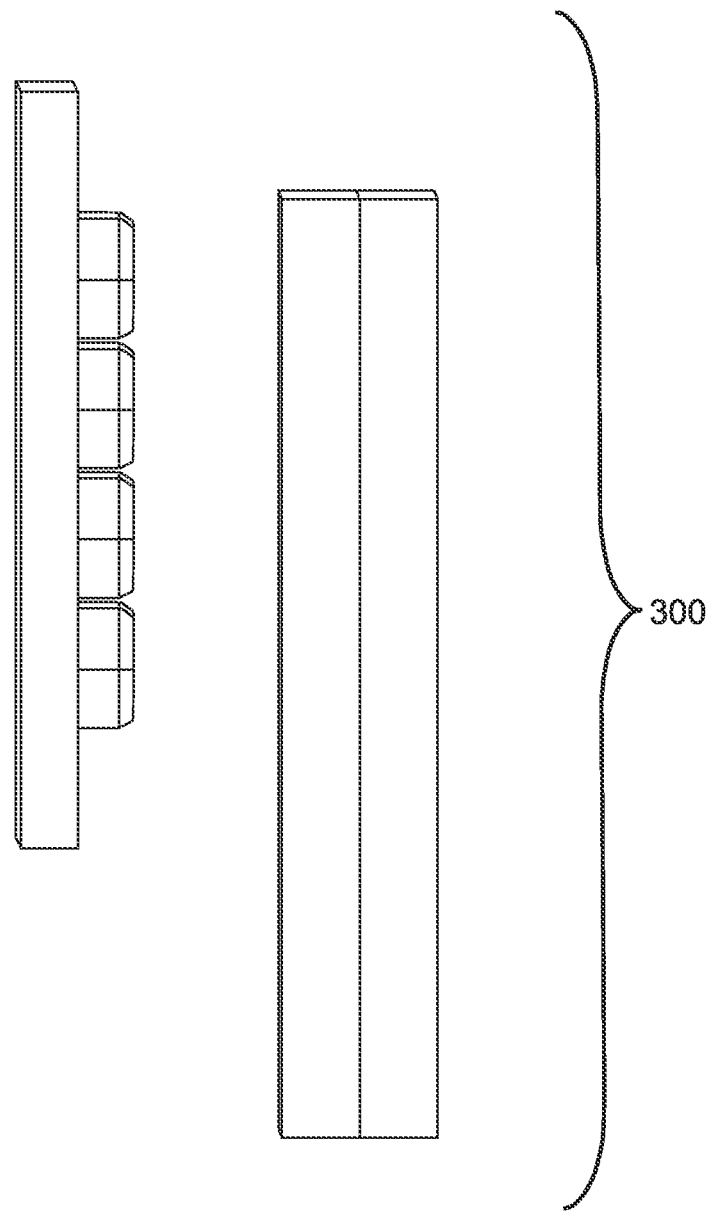
FIG. 9 is a side view of a tooling mold assembly, according to one embodiment.

Referring now to FIGS. 2A and 2B, a perspective view of a top hemisphere of a strike indicator, and a bottom hemisphere of a strike indicator, are shown. In this view, the screw 202 is still fully engaged with the nut 210 (FIG. 3), but the remaining foam of the top hemisphere 104 (which would normally be affixed to the screw 202) is pulled back for ease of viewing. The top hemisphere 104 and the bottom hemisphere 106 may define a gap 108 (FIG. 3) therebetween to facilitate engagement of the screw assembly 200 and eliminate the catching problem of conventional solutions. The screw 202 and the nut 210 are each coupled to their respective hemispheres (104 and 106), in the finished device. That coupling can be permanent (e.g., with adhesive or molding) in embodiments, or it can be semi-permanent or removable. In order to maintain a substantially spherical form factor for the overall assembled strike indicator 102 no matter how tightly or loosely screwed together the halves are, the screw 202 and the nut 210 are affixed to their respective hemispheres (104 and 106) at a central region thereof. As described above, the placement in the center may not be exact, but should be within standard part, assembly, and machining tolerances, such as by using molds described below at FIG. 9 et seq.

Both the top hemisphere 104 and the bottom hemisphere 106 may be substantially the same size to facilitate a closer friction-fit when assembled. Each hemisphere has a flange 112 that extends around the flat perimeter of the hemisphere. Again referring the FIGS. 2A and 2B, the bottom hemisphere 106 illustrates the engagement of the screw assembly 200, and the female nut coupling component when screwed into the gap 108 of the bottom hemisphere 106. The surfaces of the top and bottom hemispheres (104 and 106), may be substantially flat to encompass a slight concavity.

Figure 3:
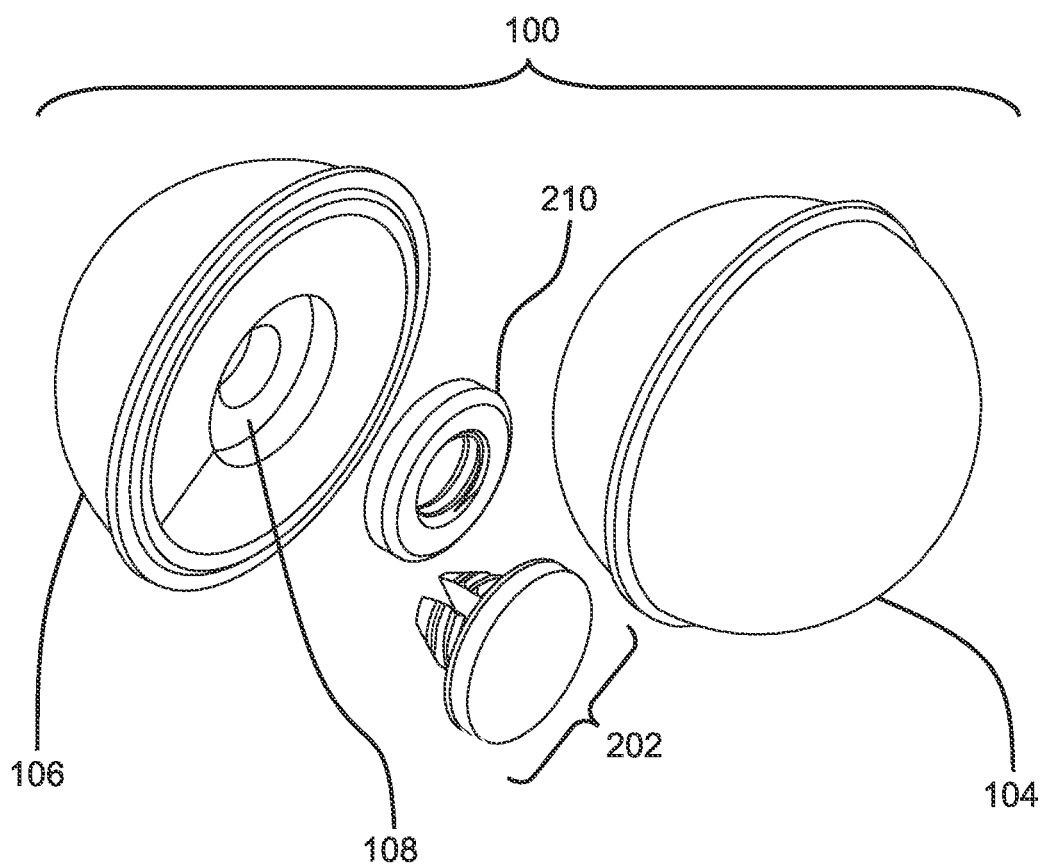
FIG. 3 is a side exploded view of a strike indicator assembly, according to one embodiment.

Referring now to FIG. 3, a representative embodiment of a strike indicator assembly 100 is shown. The strike indicator assembly 100 of FIGS. 1 and 2 includes a top hemisphere 104, a bottom hemisphere 106, a gap 108 within the bottom hemisphere 106, and a screw assembly 200 (see FIG. 8). The top hemisphere 104 and the bottom hemisphere 106 are identical in appearance and shape, aside from the gap 108 within the bottom hemisphere 106 to facilitate the setback of the screw assembly 200. In other embodiments, the gap can be present on one or both hemispheres. The top hemisphere 104, and the bottom hemisphere 106 may be made of a foam material, or any other reasonably compressible and buoyant material.

Figure 4:
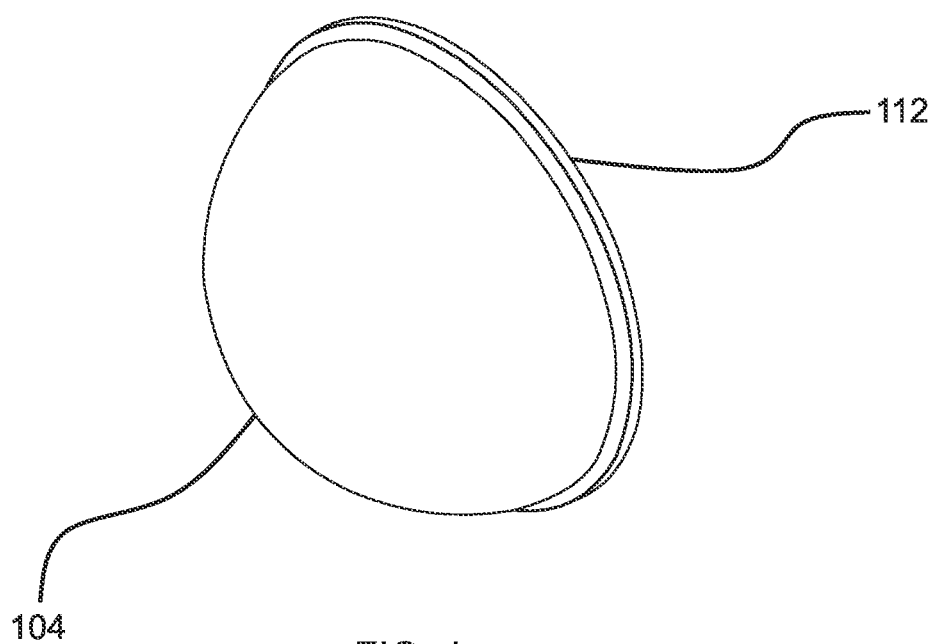
FIG. 4 is perspective view of a top hemisphere of a strike indicator, according to one embodiment.
Figure 5:
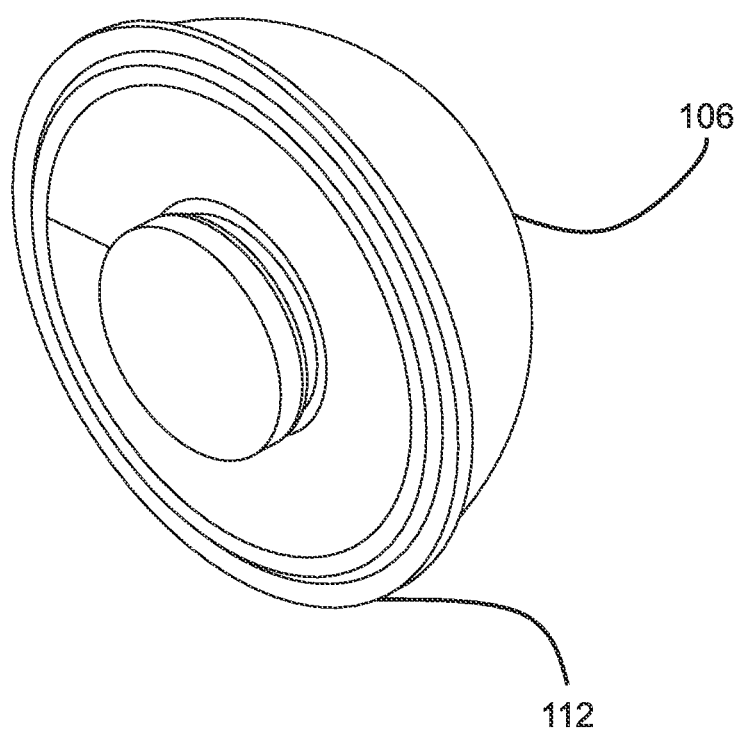
FIG. 5 is a perspective view of a bottom hemisphere of a strike indicator with a screw assembly set back into a gap, according to one embodiment.

Referring now to FIGS. 4 and 5, a representative embodiment of a top and a bottom hemisphere of a strike indicator (104 and 106), respectively, though again with the screw 202 still engaged with the nut 210. The top hemisphere 104 and the bottom hemisphere 106 may have a spherical outer dimension or form factor. While there may be some deviation from a perfectly spherical outer form factor due to manufacturing tolerances and compression or movement of the material that makes up the hemispheres 104 and 106, again it should be understood that by "substantially spherical" it is meant that there are no discontinuities or protuberances that significantly affect the overall article's performance as a spherical strike indicator. The top hemisphere 104, and the bottom hemisphere 106, may be made of a compressible foam. The bottom hemisphere 106 differs slightly from the top hemisphere 104, in the sense there may be a gap 108 within the bottom hemisphere 108 (see the cross-sectional view of FIG. 8 for more detail). The gap 108 within the bottom hemisphere allows for engagement with the screw assembly 200. The top and bottom hemisphere (104 and 106) interlock to form an assembled strike indicator 102.

In another embodiment of FIGS. 4 and 5, the top hemisphere 104, and the bottom hemisphere 106, may be shaped in an ovular nature rather than spherical. The gap 108 within the bottom hemisphere 106 may be shaped to engage with a different sized screw or attachment mechanism. As shown in these figures, a flange 112 may also extend around each hemisphere (104, 106) at the edge of the faces where they intersect, though this does not detract from the overall spherical or oval form factor.

Figure 6:
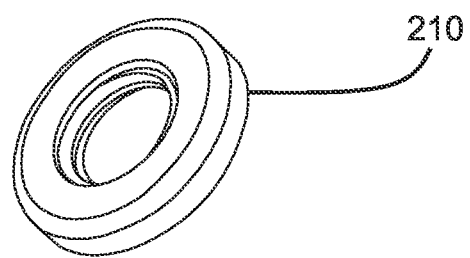
FIG. 6 is perspective view of a female nut coupling component and a corresponding male screw coupling component, according to one embodiment.
Figure 6:
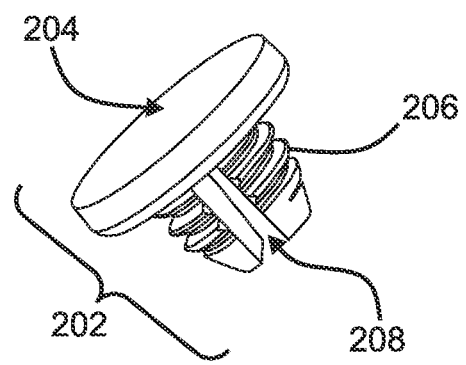

Referring now to FIGS. 6 and 7, representative embodiments of a screw assembly 200 and its components. The screw assembly 200 comprises a male screw coupling component 202, with a head 204, and a threaded portion 206. The screw 202 may have a notch 208 to allow for a fishing line 114 to pass therethrough when the screw is engaged to the coupling component (e.g., 210). The screw assembly 200 also may have a female nut coupling component 210, with a centrally located aperture that allows for the threaded portion 206 of the screw 202 to threadingly engage with the female nut coupling component 210.

As shown in FIG. 7, the nut 210 receives the screw 202, which has a lead 202A that is angled. This angled portion assists with getting the threading started, alleviating some of the complaints with conventional devices that are hard to manipulate in cold weather or with larger fingers or gloves.

Figure 8A:
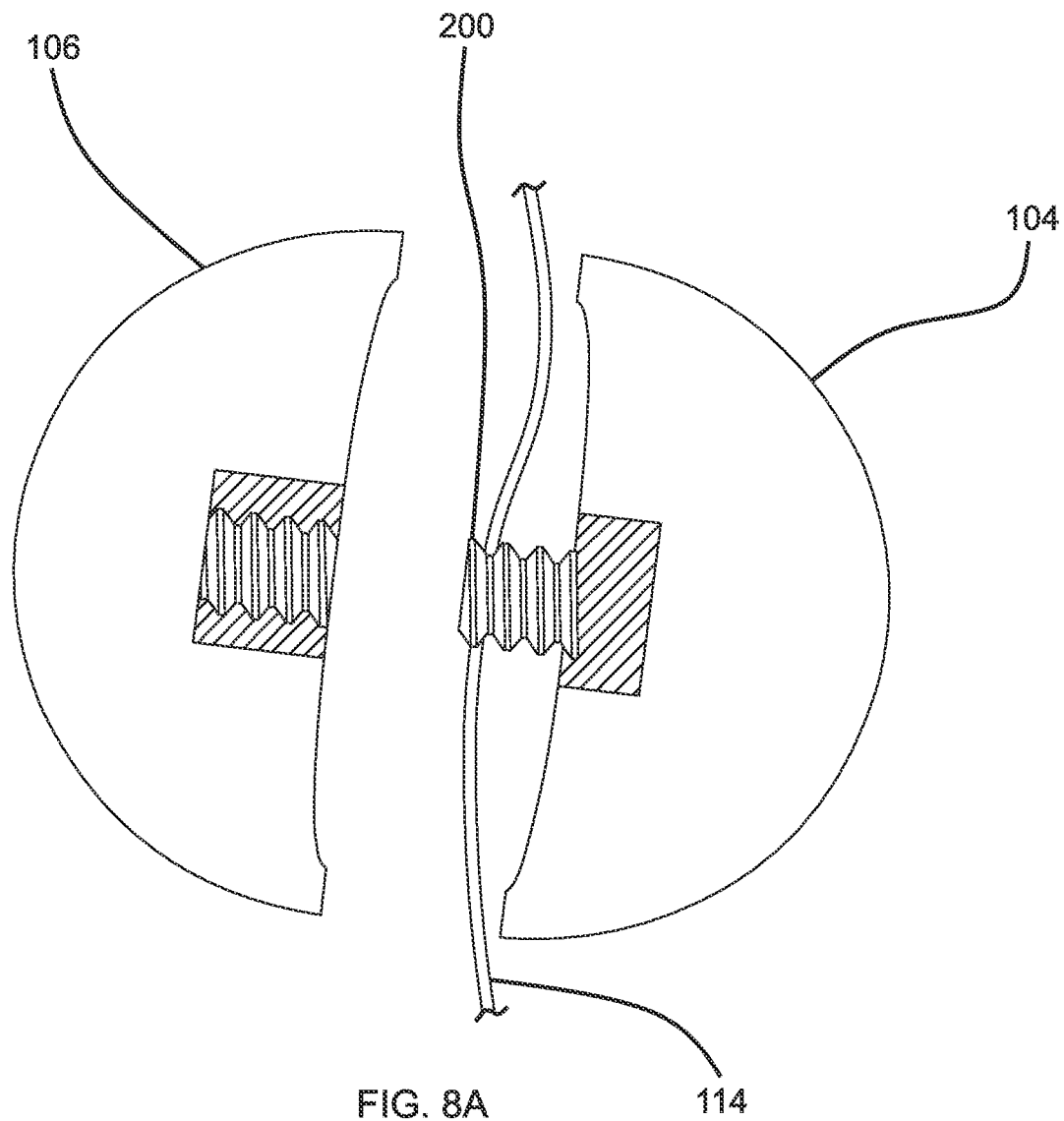
FIG. 8A is a perspective view of a disassembled strike indicator with fishing line, according to one embodiment.

Referring now to FIG. 8A, an embodiment of a disassembled strike indicator with fishing line threaded therethrough. The top hemisphere 104 and the bottom hemisphere 106 are separated to illustrate the substantially flat hemispheres. The compression fit of the top hemisphere 104 and the bottom hemisphere 106 may aid in keeping the screw assembly 200 engaged tightly, while the screw assembly 200 holds the fishing line 114 in place and prevents slip or movement by fitting tightly on the line.

Figure 8B:
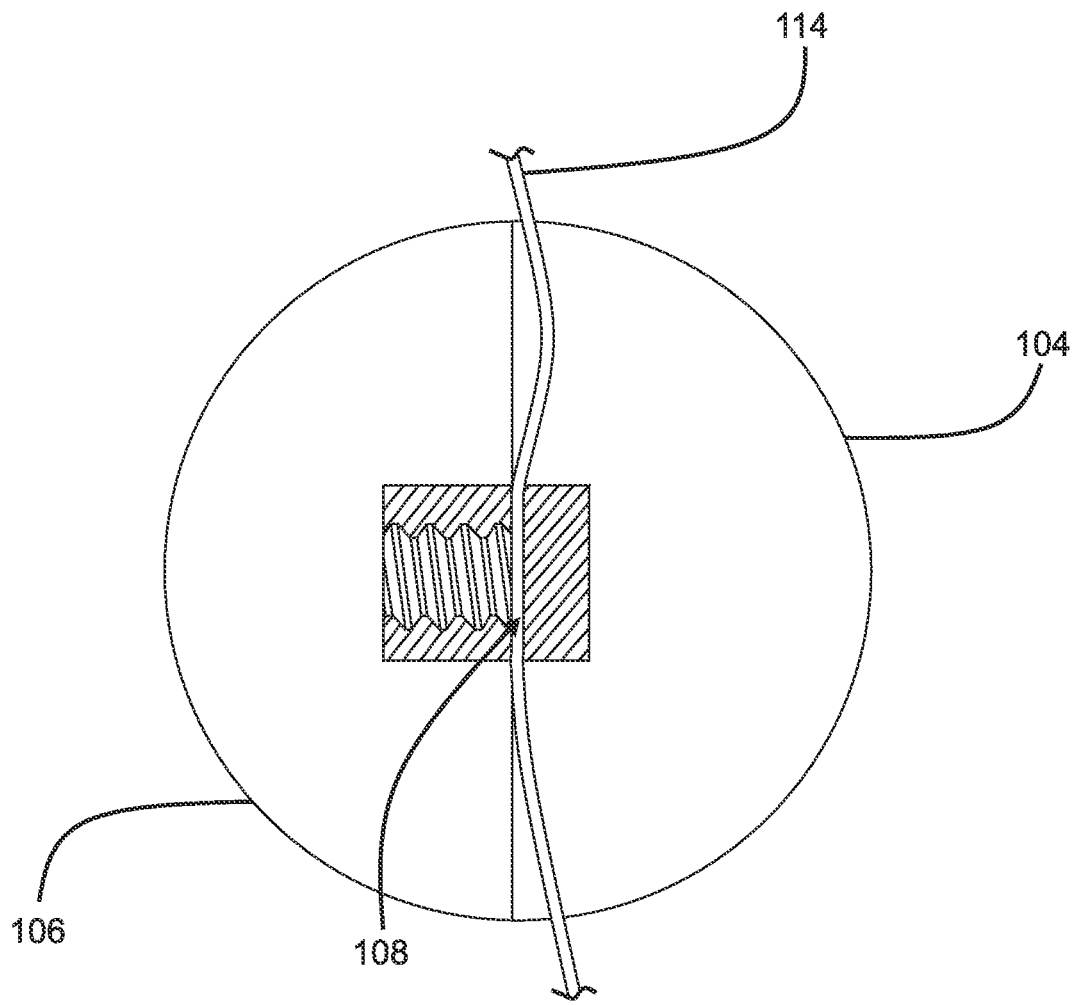
FIG. 8B is a perspective view of an assembled strike indicator with fishing line, according to one embodiment.

Referring now to FIG. 8B, an embodiment of an assembled strike indicator with fishing line threaded through. The top and bottom hemispheres (104 and 106), may have substantially flat inner surfaces that interact when the screw assembly 200 is tightened. The compressibility of the foam locks around the screw assembly 200 to prevent movement and allow the hardware to create a friction fit. The screw assembly 200 locks around the fishing line 114 to hold it in place and prevent any slip.

Figure 8C:
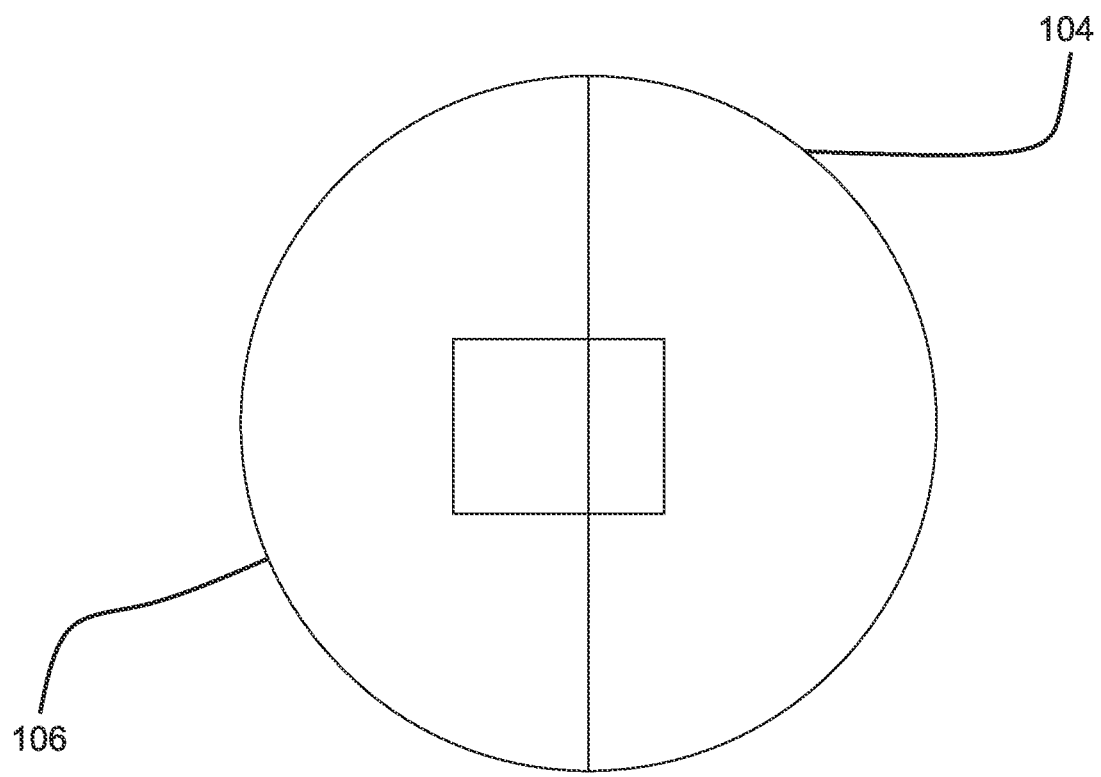
FIG. 8C is a perspective view of an assembled strike indicator with hollow hemispheres, according to one embodiment.

Referring now to FIG. 8C, an embodiment of an assembled strike indicator. The assembled strike indicator may be hollow in some embodiments for purposes of flotation. Rather than being a solid foam hemisphere, the strike indicator may have a foam, or other sufficiently buoyant material that defines the outer perimeter of the hemisphere, which the remainder of the hemisphere is hollow. The hollow nature of the strike indicator aids in flotation and can be lighter than a strike indicator that is solid.

Referring now to FIGS. 9-13, embodiments of a strike indicator cutting die and tooling mold assembly. The tooling mold assembly 300 may consist of two aluminum or steel inserts. One of the inserts may be a top insert 302 with concave cavities that may form the spherical outer dimension of the top of the strike indicator 102. The other insert may be a bottom insert 306 which may also have concave cavities to form the other half of the spherical outer dimension of the bottom of the strike indicator 102. The top insert 302 and bottom insert 306 may be compressed to form the strike indicator 102 out of a foam sheet 308 or another suitable material.

Figure 13:
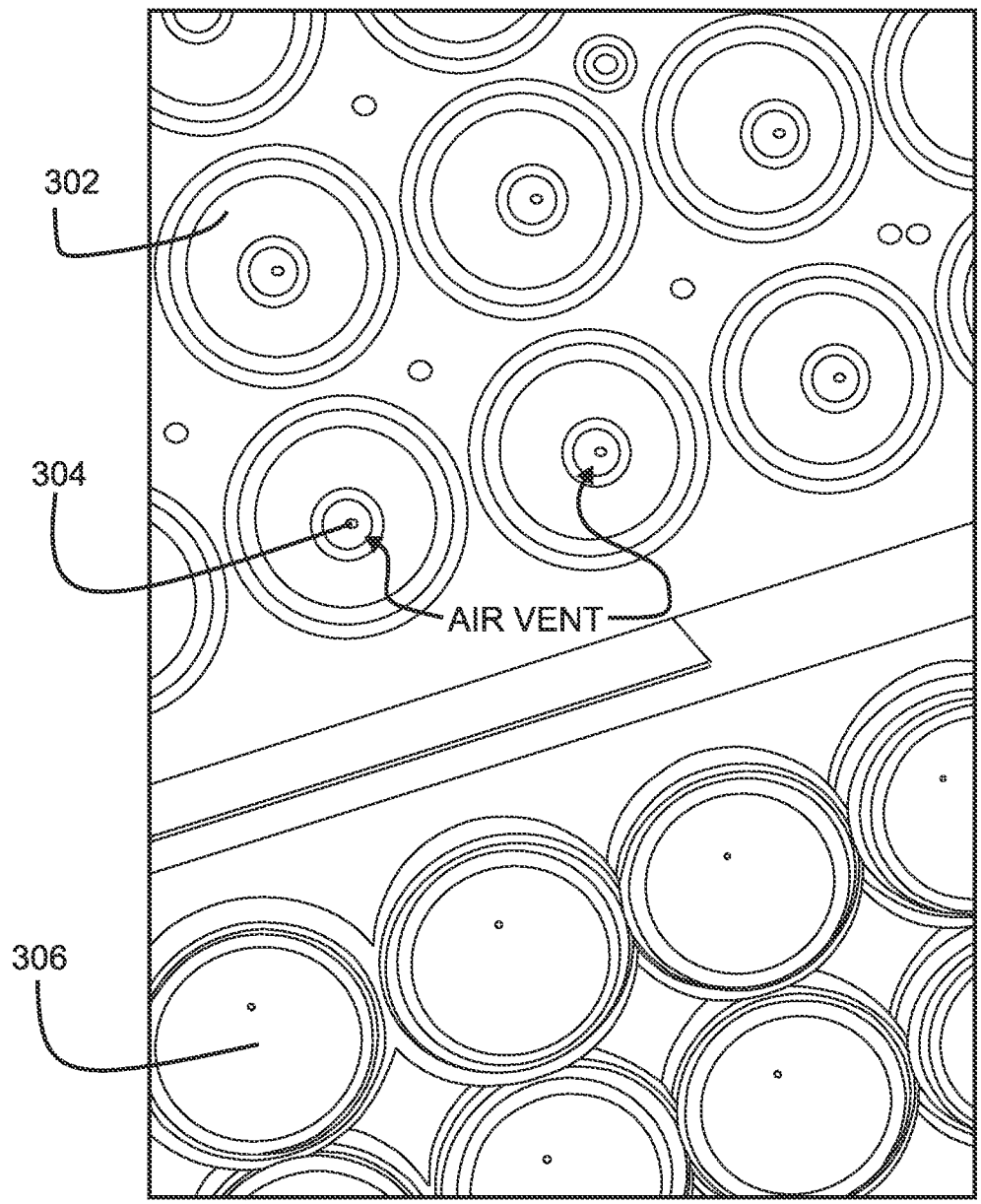
FIG. 13 is an open view of a tooling assembly, according to one embodiment, depicting air vents therein.

Referring now to FIG. 13, an embodiment of a compression molding tooling. The mold may comprise two aluminum or steel inserts, a top insert 302, and a bottom insert, 306. The top insert 302 and the bottom insert 306 may each have air vents 304 to increase ventilation during the compression process. The top insert 302 and the bottom insert 306 come together to compress a foam sheet 308, forming the spherical outer dimensions of the top hemisphere 104 and the bottom hemisphere 106 of the strike indicator 102.

Figure 14:
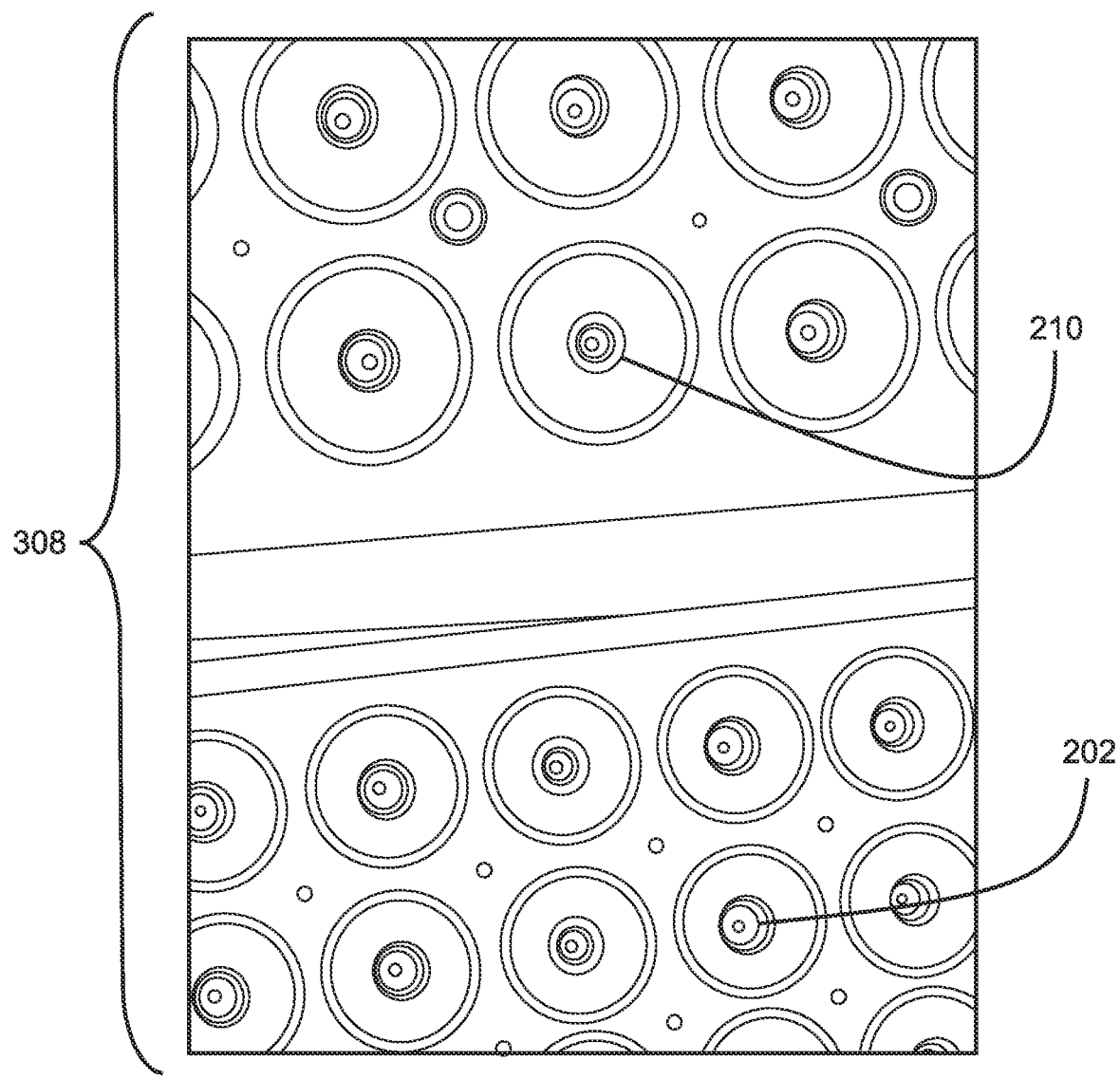
FIG. 14 is an exploded view of a molding sheet of foam prior to cutting, according to one embodiment.

Referring now to FIG. 14, an embodiment of a molded sheet of foam prior to cutting is shown. The foam sheet 308 may be cut to any diameter suitable for the strike indicator 102. After compressing and cutting the foam sheet, the female nut coupling component 210, and the male coupling screw component 202 may be arranged in the hemispheres cut from the foam sheet 308.

Referring back to FIG. 3, in assembly, the strike indicator assembly 100 may have three components: the top hemisphere 104, the bottom hemisphere 106, and the screw assembly 200. The screw assembly 200 may be comprised of the female nut coupling component 210 having a centrally located aperture, and the male screw coupling component 202, having the head 204 and the threaded portion 206. The screw assembly 200 may be assembled by engaging the female nut coupling component 210 with the threaded portion 206 of the male screw coupling component 202.

The gap 108 within the bottom hemisphere 106 accepts the nut 210, which in turn accepts the screw coupling component 202, such that screw assembly 200 holds the hemispheres 104 and 106 together. The gap 108 within the bottom hemisphere 106 may be present in the top hemisphere 106 in an alternate embodiment. The top hemisphere 104 and the bottom hemisphere 106 may be connected by engaging the flat portion of the top hemisphere 104 with the head 204 of the male screw coupling component 202, such as by adhesive. The foam of the assembled strike indicator 102 may be reasonably compressible and allows for a friction fit locking mechanism to hold the top hemisphere 104 and the bottom hemisphere 106 together.

Each hemisphere may have a slight indentation on the inner surface so that once they are screwed together (using the screw assembly 200), the flange 112 of each hemisphere will still fit tightly together. The indentation on the inner surface of each hemisphere may assist with the friction-fit primarily caused by the locking nut and screw, because the internal assembly components may be further compressed to prevent movement of the fishing line 114. Without said indentation the foam may become too dense to allow the screw and nut hardware to come together and lock the line. The male screw coupling component 202 may be relatively large to support a friction-fit of the top and bottom hemisphere. The male screw coupling component 202 may thereby force the foam of each hemisphere to compress around the head 204 of the male screw coupling component 202.

In operation, the top hemisphere 104 and the bottom hemisphere 106 allow for fishing line 114 to be attached internally, passing through the space between the top hemisphere 104 and the bottom hemisphere 106. The fishing line 114 may pass through the notch 208 to be secured in the center of the assembled strike indicator 102. The notch 208 facilitates use of any diameter of fishing line 114 up to the width thereof, preventing the need to have different sized screws and attachment mechanisms. The notch 208 also ensures that the line passes substantially through the center of the strike indicator assembly 100, preventing imbalance. The internal attachment of fishing line 114 enables easy application and repositioning of the assembled strike indicator 102.

Figure 10:
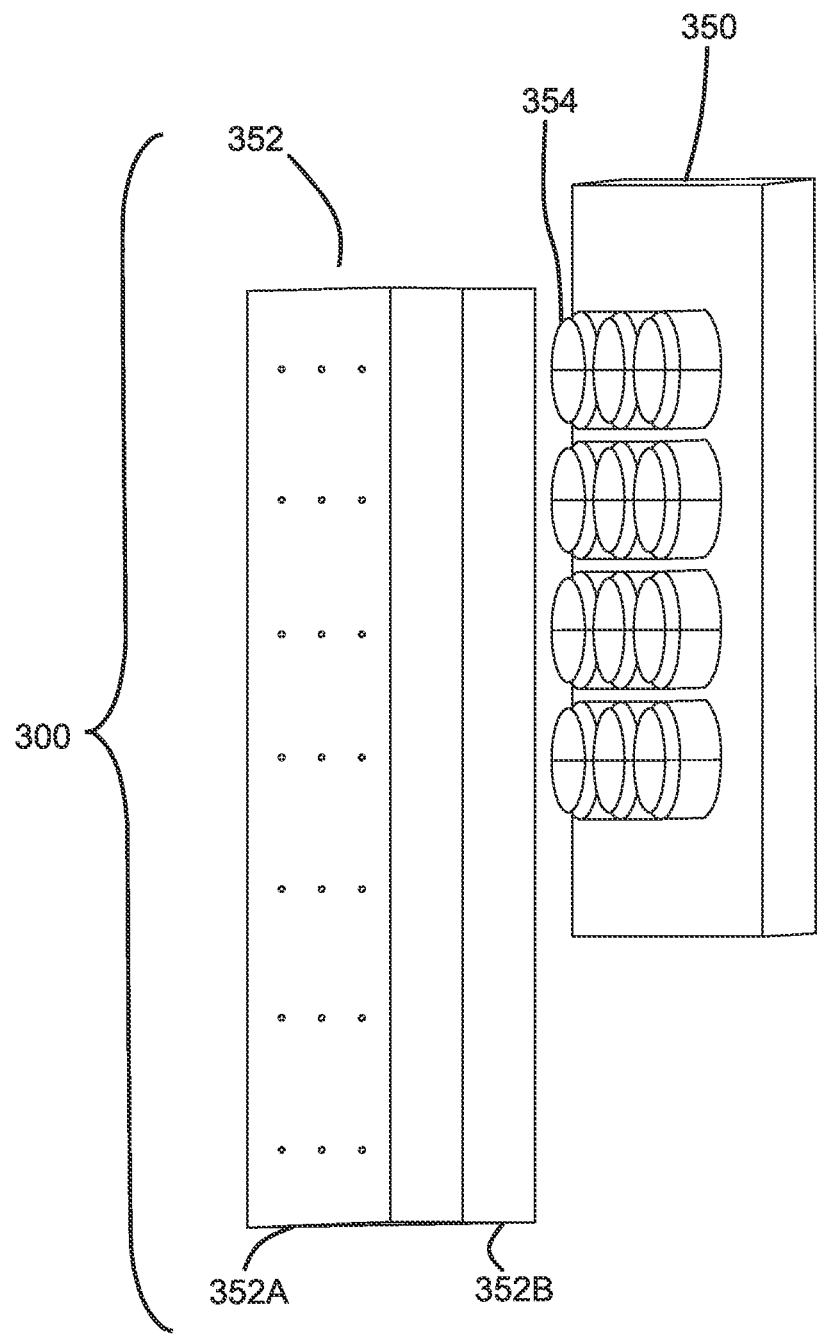
FIG. 10 is a perspective view of a cutting die and mold assembly according to one embodiment.
Figure 11:
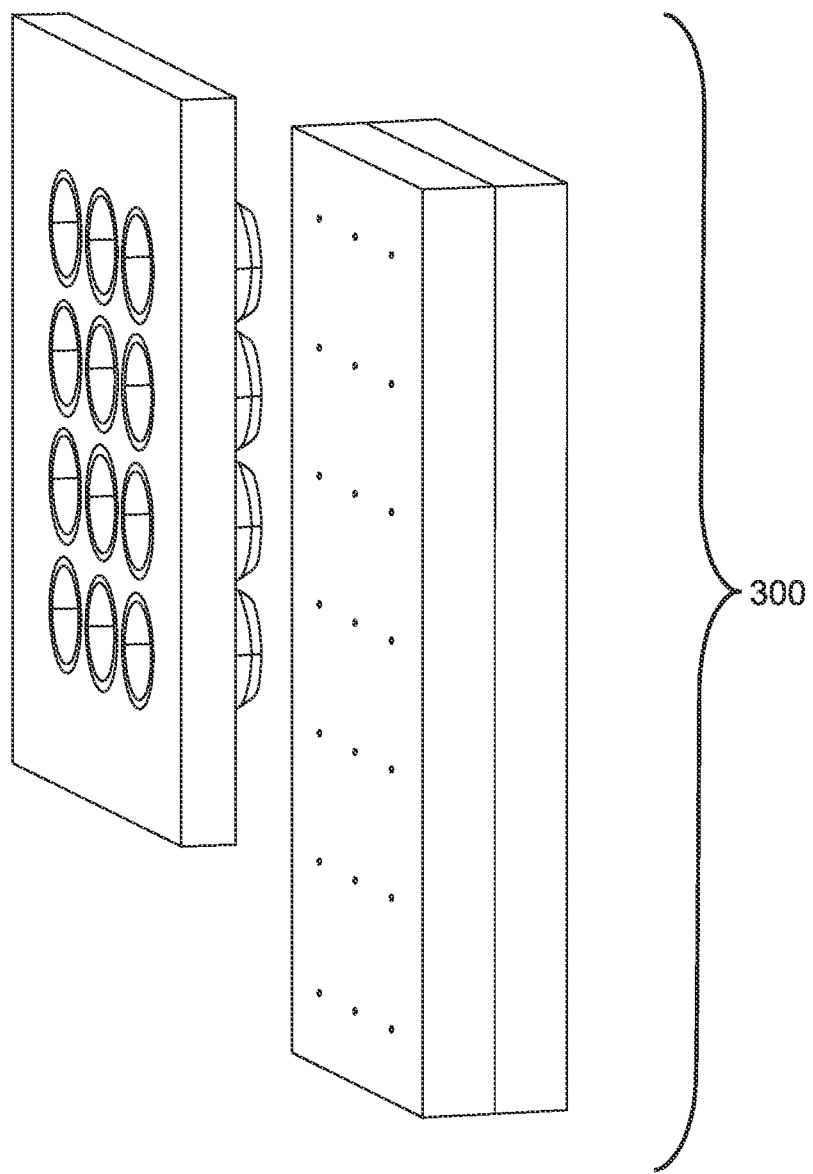
FIG. 11 is a perspective view of a cutting die and mold assembly according to one embodiment.
Figure 12:
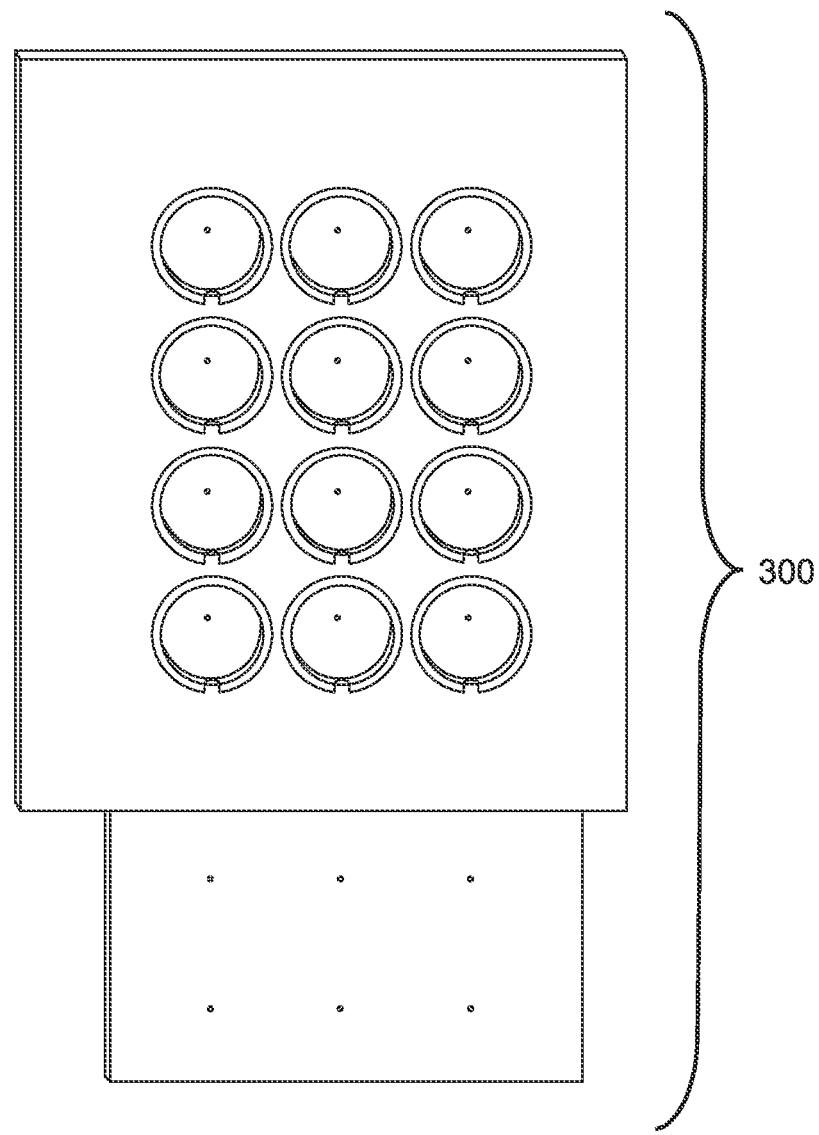
FIG. 12 is a front view of a cutting die mold assembly according to one embodiment.

The tooling mold assembly 300 may be a two-step process. FIGS. 9-12 are the dies used to cut molded foam hemispheres out of the sheet. FIG. 10 shows cutting die 350 and compression mold tooling 352. FIG. 11 shows these same components from a rear perspective view, while FIG. 12 is a read view. FIG. 13 is a detailed view of the inside of the compression molding tooling, which is a part of the tooling mold assembly 300. That is, if the halves 352A and 352B or the compression mold tooling 352 were separated, the interior view is what is shown in FIG. 13. The cutting die 350 of FIG. 13 includes cutting edges 354. An aluminum or steel fixture may be used to ensure that the hardware gets placed at the right depth in relation to the foam. This may be necessarily if foam tolerances are too great to ensure hardware placement at a consistent depth. It should be understood that while a cutting die (350) or compression mold tooling (352) may be used in some embodiments, other widely used mechanisms for cutting, machining out, or either subtractively or additively forming foam or hollow spheres or hemispheres can be used.

The tooling mold assembly 300 may be a compression-based system. The top insert 302 and the bottom insert 306 engage around the foam sheet 308 to form the spherical outer form factor of each hemisphere. As the top insert 302 and bottom insert 306 are heated and pressed together around the foam sheet 308, the mold of each hemisphere is formed. Then the foam sheet 308 can be cut to remove the finished hemispheres. In another embodiment, the tooling mold assembly may have top inserts 302 and bottom inserts 306 that vary in size. In yet another embodiment, the foam sheet 308 may be any material that is light and buoyant to create the strike indicator 102.

In another embodiment, a solid screw may be used rather than a split screw. A user can wrap the line around the solid screw, rather than passing the line through the split screw as described above. Advantages to this arrangement are less complex parts and ease of use for some users, for whom threading the screw could be difficult. Wrapping the line around the screw is a quick alternative to threading the line through a split screw and can be done even while the two hemispheres are partially threadably connected, but wrapping the line can also be harder on the line as it is being turned at a tight angle with force applied thereon, which can cause breakage.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A strike indicator assembly comprising:
a top hemisphere defining an initially uncompressed inner surface and a substantially hemispherical outer surface, the top hemisphere made of a compressible foam, the initially uncompressed inner surface of the top hemisphere comprising an outer perimeter region and a recessed central region, wherein the outer perimeter region surrounds the recessed central region and the recessed central region is recessed inwardly away from the outer perimeter region and into the compressible foam;
a bottom hemisphere defining an initially uncompressed inner surface and a substantially hemispherical outer surface, the bottom hemisphere made of the compressible foam, the initially uncompressed inner surface of the bottom hemisphere comprising an outer perimeter region and a recessed central region, wherein the outer perimeter region surrounds the recessed central region and the recessed central region is recessed inwardly away from the outer perimeter region and into the compressible foam;
a rigid internal component configured to hold a fishing line, the rigid internal component comprising:
a male screw coupling component made of a rigid material and affixed to the top hemisphere at the recessed central region of the initially uncompressed inner surface thereof by being received inside a first volume extending inwardly away from the recessed central region and being defined within the compressible foam; and
a female nut coupling component made of the rigid material and affixed to the bottom hemisphere at the recessed central region of the initially uncompressed inner surface thereof by being received inside a second volume extending inwardly away from the recessed central region and being defined within the compressible foam, the female nut coupling component configured to rotationally engage with the male screw coupling component;

wherein the male screw coupling component and the female nut coupling component are configured to hold the fishing line therebetween in place and prevent slip or movement by fitting tightly on the line when the male screw coupling component and the female nut coupling component are engaged;

wherein the initially uncompressed inner surfaces of the top and the bottom hemispheres are configured to at least partially flatten against one another by compressing the outer perimeter regions of the initially uncompressed inner surfaces of the top and the bottom hemispheres when the male screw coupling component is engaged with the female nut coupling component, such that when the female nut coupling component is engaged with the male screw coupling component the at least partially flattened inner surfaces of the top hemisphere and the bottom hemisphere provide a friction fit to prevent rotation of the female nut coupling component relative to the male screw coupling component.

2. The strike indicator assembly of claim 1, wherein the male screw coupling component is a split screw.

3. The strike indicator assembly of claim 1, wherein the male screw coupling component includes an angled lead portion.

4. The strike indicator assembly of claim 1, wherein the recessed central region of the initially uncompressed inner surface of the top hemisphere and the recessed central region of the initially uncompressed inner surface of the bottom hemisphere are both concave.

5. The strike indicator assembly of claim 1, wherein the top hemisphere and the bottom hemisphere can move away from each other by unscrewing the male screw coupling component from the female nut coupling component.

6. The strike indicator assembly of claim 1, wherein when the initially uncompressed inner surfaces of the top and the bottom hemispheres at least partially flatten against one another, the initially uncompressed inner surfaces of the top and the bottom hemispheres are flush with one another but for a gap adjacent to the male screw coupling component.

7. The strike indicator assembly of claim 6, wherein the gap is located adjacent to the bottom hemisphere.

8. The strike indicator assembly of claim 6, wherein the male screw coupling component and the female nut coupling component form a screw assembly that is set back into the bottom hemisphere and is adjustable, and the gap is configured to hold the fishing line and is made tighter or looser by a degree to which the screw assembly is set back into the bottom hemisphere.

9. The strike indicator assembly of claim 8, wherein the top and bottom hemispheres can frictionally lock around the fishing line at a range of diameters of the fishing line.

10. The strike indicator assembly of claim 6, wherein the gap is located adjacent to the top hemisphere.

11. The strike indicator assembly of claim 1, wherein the first volume of the top hemisphere and the second volume of the bottom hemisphere each define a cavity.

12. The strike indicator assembly of claim 1, wherein the compressible foam that the top and bottom hemispheres are made of comprises low density materials including wood, cork, plastic, or a combination of low density materials.

* * * * *